(12) United States Patent
Heiges

(10) Patent No.: US 8,793,923 B1
(45) Date of Patent: Aug. 5, 2014

(54) BURLAP-WRAPPED, SWAY-RESISTANT DECOY

(75) Inventor: Charles W Heiges, Port Clinton, OH (US)

(73) Assignee: Fowl Foolers LLC, Port Clinton, OH (US)

( * ) Notice: Subject to any disclaimer, the term of this patent is extended or adjusted under 35 U.S.C. 154(b) by 27 days.

(21) Appl. No.: 13/065,300

(22) Filed: Mar. 18, 2011

(51) Int. Cl.
*A01M 31/06* (2006.01)

(52) U.S. Cl.
USPC ..................................... 43/3; 43/2

(58) Field of Classification Search
USPC ......................................................... 43/2, 3
IPC ..................................................... A01M 31/06
See application file for complete search history.

(56) References Cited

U.S. PATENT DOCUMENTS

| | | | |
|---|---|---|---|
| 547,033 A | 10/1895 | Ross | |
| 2,185,013 A * | 12/1939 | Bonetti | 43/3 |
| 2,719,376 A | 10/1955 | Risch | |
| 2,755,588 A * | 7/1956 | Johnson | 43/3 |
| 3,704,538 A * | 12/1972 | Gagnon | 43/3 |
| 3,888,032 A * | 6/1975 | Gagnon | 43/3 |
| 4,890,408 A * | 1/1990 | Heiges et al. | 43/3 |
| 5,899,014 A * | 5/1999 | Bornhoft et al. | 43/3 |
| 6,357,161 B1 * | 3/2002 | Best | 43/3 |
| 6,543,176 B1 * | 4/2003 | McGhghy | 43/3 |
| 8,485,856 B2 * | 7/2013 | Paternostro | 43/3 |
| 2009/0126253 A1 * | 5/2009 | Wood et al. | 43/3 |

* cited by examiner

*Primary Examiner* — Darren W Ark
*Assistant Examiner* — Lisa Tsang
(74) *Attorney, Agent, or Firm* — Richard K Thomson

(57) ABSTRACT

A decoy with a counterweight suspended from a central keel attached along the centerline of the decoy behind the decoy's center-of-gravity. When a wave swells beneath the decoy creating a force which would tend to cause a side-to-side rocking motion of the decoy, the counterweight absorbs a portion of the sway-inducing force, resisting the tendency of the decoy to rock. This provides a more natural bobbing of the decoy producing a believable rise and fall of the decoy's head and body portion.

8 Claims, 1 Drawing Sheet

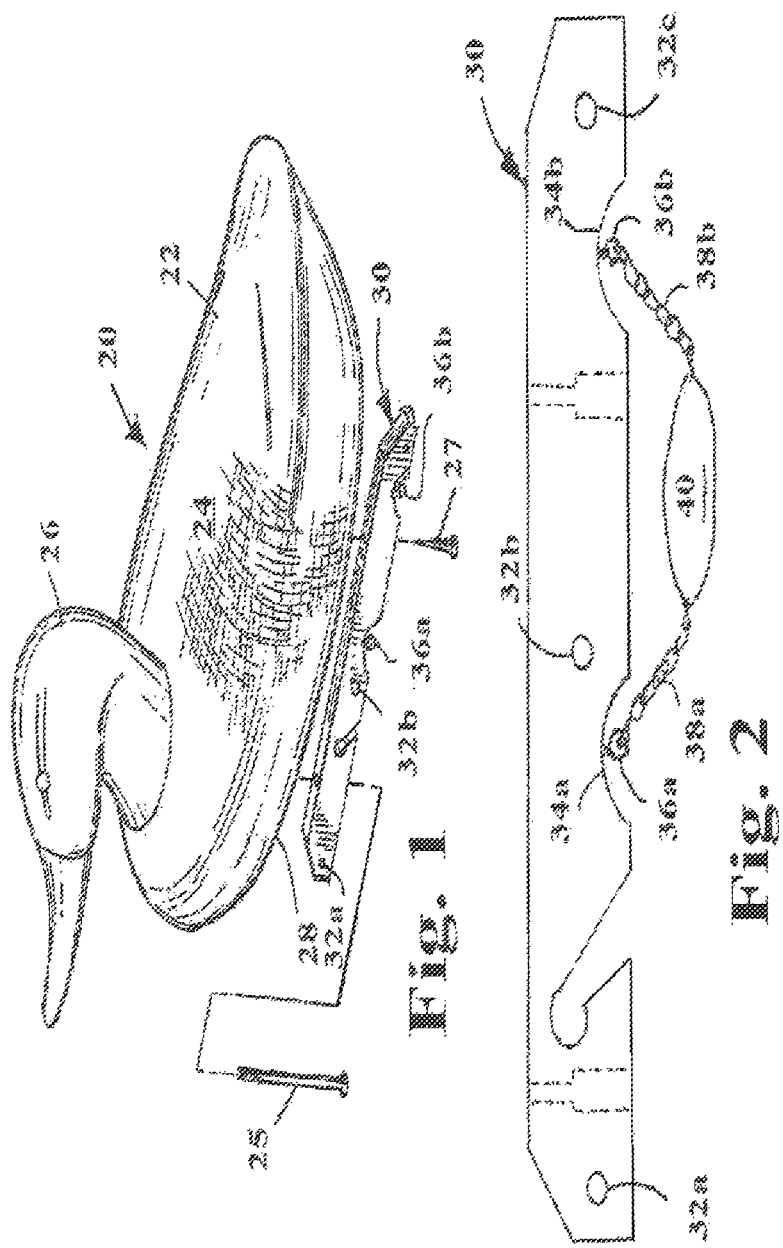

BURLAP-WRAPPED, SWAY-RESISTANT DECOY

BACKGROUND AND SUMMARY OF THE INVENTION

The present invention relates to the field of sporting goods. More particularly, the present invention is directed to an improved duck decoy with improved sway resistance.

The present invention is directed to an improvement to Applicant's U.S. Pat. No. 4,890,408 hereby incorporated by reference. The duck decoy described and claimed therein, marketed under the product name FOWL FOOLERS™, features a coarse, burlap-like fabric adhesively secured to the exterior of the body of the decoy, as well as a longitudinal keel running beneath the body which enhances the stability of the decoy.

Various types of decoys have been employed heretofore in the hunting of waterfowl such as ducks and geese in order to attract the fowl and entice them to fly over or land on a designated particular area of land or water. When hunting is to be conducted in a selected area, a number of decoys are deployed in the area to attract overflying fowl to that area. Of course, the more natural and prominent the deployed decoys can be made to appear, the more likely they are to attract overflying fowl. The body and head configuration, the surface coloring and texture, and the manner in which the anchored decoy rides or floats in the water, all influence the appearance of a group of decoys.

Efforts have continued over the years to improve the appearance and performance of such decoys, and to that end it has been suggested the bodies may be formed in various ways. For example, U.S. Pat. No. 547,033 discloses a decoy formed by filling a fabric covering affixed to a floating base with loose material such as grass, straw, leaves, paper, or excelsior. U.S. Pat. No. 2,719,376 pertains to a decoy having a hollow molded pulp body. U.S. Pat. No. 3,704,538 suggests a decoy having an air inflatable body portion, while the decoy of U.S. Pat. No. 3,888,032 employs as the body a flexible, resilient, molded shell which is collapsible but which will return to its original shape when the collapsing force is removed. The surfaces of the bodies are generally configured and ornamented in one way or another to resemble, as nearly as possible, the feather arrangement and coloring of a particular species of waterfowl. In most present day decoys the surface of the body itself is formed with a feature appropriate to achieve the desired visual effect, and the surface is then painted or decorated. Such an arrangement has not been found entirely satisfactory in that the surface does not present a realistic appearance and the finish is often damaged by the rough handling to which the decoys are subjected.

Most present day decoys are also provided with a keel structure as typically shown by the aforementioned patents. Such keels serve a dual purpose in that they both provide stability and a more life-like stance to the decoy as it floats on the surface of the body of water, and further provide a means for affixing a line to the decoy for anchoring it at selected locations. The keel thus stabilizes the decoy to minimize unnaturally appearing rotation, rocking, and sideways movement due to winds, waves and currents. It also serves to maintain the decoy in an upright position and to right the decoy should it overturn or be initially deployed in an overturned position. The keels have included various arrangements for not only affixing the anchor line to the decoy, but also for storing the line in a wrapped condition while the decoy is not in use and for storing excess line to permit effective use of the anchor in bodies of water of different depths. Again, the prior art keel constructions have not proven entirely satisfactory in that they tend to be expensive to produce and complicated and cumbersome to use. Such decoys are often deployed and retrieved under very adverse conditions since waterfowl hunting is most successfully conducted during periods of adverse cold, rainy, windy weather. Thus, it is highly desirable that the anchor line be readily manipulated during deployment and retrieval and that it remain securely in the selected position during deployment of the decoy.

One feature which could use improvement on this, as well as on other commercially available decoys, is inhibiting the swaying of the duck. As the decoy rides the waves, they exhibit an unnatural side-to-side rocking motion which can alert birds on the wing that the decoys are, just that: decoys. Previous attempts to cope with this problem including the use of weights and/or anchors, have resulted in an altered affected rocking motion which, although different, is every bit as unnatural as the movement of the decoy without the "solution" being offered. It is a principal object of this invention to provide a sway-resistant feature which will provide a more natural movement on the waves which will encourage an incoming flock to join their floating comrades.

The present invention features a duck decoy for floating on a surface of a body of water, the duck decoy including a) a body portion featuring a burlap-like fabric secured to an exterior thereof; b) a head portion attached to the body portion; c) an elongated keel attached to and extending beneath the body portion, the keel portion including i) a generally continuous lower edge having a first indented recess in which an attachment means is secured; ii) a second indented recess in the generally continuous lower edge in which a second attachment means is secured; iii) a counterweight flexibly suspended from the first and second attachment means beneath the elongated keel; whereby when a wave swells beneath the body portion creating a force tending to cause the decoy to sway laterally, the counterweight tends to remain stationary absorbing a portion of that force thereby resisting the decoy's tendency to sway laterally. Preferably, the first and second recesses are located in such a manner as to suspend the counterweight behind a center of gravity of the decoy enabling a head end of the decoy to perform a natural rise and fall relative to the surface of the water. More preferably, the counterweight is mounted beneath a rearward one-third of said decoy.

There are a plurality of holes formed in the elongated keel with each of the plurality of holes affording a location to attach an anchor-suspending strand of rope, or the like. Preferably, one of the plurality of holes is located substantially beneath a center-of-gravity of the decoy.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which FIG. 1 is a perspective view of a decoy equipped with the modified keel of the present invention; and, FIG. 2 is a side view of the first embodiment depicting the modified keel of the present invention.

DETAILED DESCRIPTION OF THE PREFERRED EMBODIMENT(S)

A first embodiment of the sway-resistant decoy of the present invention is depicted in FIG. 1 generally at 20. The decoy 20 comprises body portion 22 which is covered with a burlap-like fabric 24 and has head 26 attached to the body portion 22. An elongated keel 30 is affixed to the bottom 28 of decoy 20 using threaded fasteners 25, 27. Keel 30 has a forward, a mid-ship and an aft through bore 32a, 32b, and 32c, respectively for attaching a tie line for suspending an anchor. Indented recesses 34a and 34b are provided in the generally continuous lower edge 35. Each indented recess 34a, 34b is provided with an attachment means 36a, 36b from which counterweight 40 is flexibly suspended by chain lengths 38a and 38b. It will be appreciated that chain lengths 38a, 38b may be replaced by any other corrosion-resistant material, such as wire, fishing line, etc., without departing from the scope of the invention. Counterweight 40 is preferably positioned aft of the center of gravity of decoy 20 and, more preferably, in the aft ⅓ of the length of the body portion 22. By adding the counterweight 40 aft of the center of gravity, the decoy will bob head-up, i.e., have movement which is natural, duck-like motion. This positioning of the counterweight 40 enables head 26 of decoy 20 to perform a natural rise and fall relative to the surface of the water. The position of the counterweight 40 beneath a centerline of decoy 20 results in the weight seeking to maintain its position, i.e., to resist the side-to-side motion caused by a swell. Hence, when a wave swells beneath the body portion 22 creating a force tending to cause decoy 20 to sway laterally, counterweight 40 tends to remain stationary absorbing a portion of that force thereby resisting the decoy's tendency to sway laterally.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A duck decoy for floating on a surface of a body of water, said duck decoy comprising:
   a) a body portion featuring a burlap-like fabric secured to an exterior thereof;
   b) an elongated keel portion attached to and extending beneath said body portion, said keel portion including
      i) a generally continuous lower edge having a first indented recess in which a first flexible attachment means is secured;
      ii) a second indented recess in said generally continuous lower edge in which a second flexible attachment means is secured;
      iii) a counterweight flexibly suspended from said first and second flexible attachment means beneath and spaced from said elongated keel portion in a position out of physical contact with said elongated keel portion, the counterweight being in nearby proximity to said continuous lower edge of said keel and out of contact with a solid bottom of the body of water;
   whereby when a wave swells beneath said body portion creating a force tending to cause said decoy to sway laterally, said counterweight tends to remain stationary, absorbing a portion of that force and thereby resisting the decoy's tendency to sway laterally.

2. The duck decoy of claim 1 wherein said first and second recesses are located in such a manner as to suspend said counterweight behind a center of gravity of said decoy enabling a head end of said decoy to perform a natural rise and fall relative to the surface of the water.

3. The duck decoy of claim 2 wherein said counterweight is mounted beneath a rearward one-third of said decoy.

4. The duck decoy of claim 1 further comprising a plurality of holes in said elongated keel, each of said plurality of holes affording a location to attach an anchor-suspending strand.

5. The duck decoy of claim 4 wherein one of said plurality of holes is located substantially beneath a center-of-gravity of said decoy.

6. The duck decoy of claim 1 further comprising a head portion attached to said body portion.

7. A duck decoy for floating on a surface of a body of water, said duck decoy comprising:
   a) a body portion having a bottom and featuring a fabric adhesively secured to an exterior thereof;
   b) an elongated keel portion attached to and extending beneath said body portion, said keel portion including
      i) an elongated member having two ends, said elongated member terminating at each end in a portion tapering upwardly and inwardly toward said bottom of said body portion;
      ii) a generally continuous lower edge having a first indented recess in which a first flexible attachment means is secured;
      iii) a second indented recess in said generally continuous lower edge in which a second flexible attachment means is secured;
      iv) a counterweight flexibly suspended from said first and second flexible attachment means beneath and spaced from said elongated keel in a position out of physical contact with said elongated keel portion, the counterweight being in nearby proximity to said continuous lower edge of said keel portion and out of contact with a solid bottom of the body of water;
   whereby when a wave swells beneath said body portion creating a force tending to cause said decoy to sway laterally, said counterweight tends to remain stationary, absorbing a portion of that force and thereby resisting the decoy's tendency to sway laterally.

8. The duck decoy of claim 7 further comprising a head portion attached to said body portion.

* * * * *